United States Patent
Root et al.

(10) Patent No.: US 12,531,724 B2
(45) Date of Patent: Jan. 20, 2026

(54) POST-QUANTUM CRYPTOGRAPHY FOR SECURE BOOT

(71) Applicant: Google LLC, Mountain View, CA (US)

(72) Inventors: Kenneth Leon Root, Menlo Park, CA (US); Daniel Saul Fess, San Francisco, CA (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 18/763,675

(22) Filed: Jul. 3, 2024

(65) Prior Publication Data
US 2025/0015981 A1    Jan. 9, 2025

Related U.S. Application Data

(60) Provisional application No. 63/512,419, filed on Jul. 7, 2023.

(51) Int. Cl.
| | |
|---|---|
| *H04L 9/08* | (2006.01) |
| *G06F 21/57* | (2013.01) |
| *G06F 21/64* | (2013.01) |
| *H04L 9/06* | (2006.01) |
| *H04L 9/32* | (2006.01) |

(52) U.S. Cl.
CPC .......... *H04L 9/0852* (2013.01); *G06F 21/575* (2013.01); *G06F 21/64* (2013.01); *H04L 9/0643* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 10,726,133 B1* | 7/2020 | Vidyadhara | G06F 9/4411 |
| 10,747,882 B2* | 8/2020 | Liu | G06F 21/575 |
| 2024/0419608 A1* | 12/2024 | Park | G06F 12/1408 |

OTHER PUBLICATIONS

Bernstein et al., "SPHINCS: practical stateless hash-based signatures", Berlin, Heidelberg: Springer Berlin Heidelberg, Feb. 2, 2015, 30 pp.
Denning, "Is Quantum Computing a Cybersecurity Threat", vol. 107, No. 2, American Scientist, Mar. 2019, 8 pp., URL: https://www.americanscientist.org/article/is-quantum-computing-a-cybersecurity-threat.

* cited by examiner

*Primary Examiner* — Benjamin E Lanier
(74) *Attorney, Agent, or Firm* — Shumaker & Sieffert, P.A.

(57) ABSTRACT

In general, a computing device comprising a secure memory, a storage device, and a processor may be configured to implement the techniques. The secure memory may store a post-quantum cryptographic reference signature (PQCRS). The storage device may store bootloader stages, a list of classical cryptographic reference signatures (CCRS), and a PQC public key (PQCPK). The processor may, prior to executing a first bootloader stage, obtain the list of CCRS, the PQCRS, and the PQCPK. The processor may also apply a PQC algorithm with respect to the PQCRK and the list of CCRS to obtain a PQC verification signature (PQCVS), and responsive to the PQCVS matching the PQCRS, compare a first CCRS in the digitally signed list of CCRS to a first CC verification signature (CCVS) obtained based on the first bootloader stage. The processor may also, responsive to the first CCVS matching the first CCRS, execute the first bootloader stage.

20 Claims, 2 Drawing Sheets

POST-QUANTUM CRYPTOGRAPHY FOR SECURE BOOT

This application claims the benefit of U.S. Provisional Patent Application No. 63/512,419, filed 7 Jul. 2023, the entire contents of which is incorporated herein by reference.

BACKGROUND

Secure boot refers to various security measures employed by a computing device when initiating execution of (or, in other words, "booting up") software, such as an operating system. The computing device may initiate execution of the operating system using a bootloader that performs various security measures (e.g., cryptography) to ensure that stages of the bootloader have not been tampered with or otherwise edited. The computing device may verify one or more signatures associated with each stage of the bootloader to authenticate, prior to execution, each stage of the bootloader, halting execution of one or more stages that fail authentication to avoid allowing access by malicious or otherwise altered stages.

The signatures for each of the stages of the bootloader may conform to various industry standards designed for so-called "classical computers," which may be susceptible to advances in computing technology. For example, computers are being developed that exploit quantum mechanical phenomena (and hence are referred to as "quantum computers"), which may allow quantum computers to perform some calculations exponentially faster than such classical computers. One such calculation that quantum computers perform much faster than classical computers is authentication of signatures that may allow maliciously modified stages of the operating system to execute and thereby grant unrestricted access to the underlying computer hardware (e.g., including the memory, which may store confidential or personal information).

To overcome the potential risk of quantum computers breaking encryption performed according to industry standards designed for classical computers, new industry standards for encryption are being developed that address the processing efficiency of quantum computers (where such new industry standards define algorithms for so-called "post-quantum cryptography"). However, post-quantum cryptography may involve significantly larger signatures that consume significantly more amounts of memory and require significantly more processing resources (e.g., processing cycles, memory bus bandwidth, etc.) and associated power to authenticate compared to existing industry standards that define cryptography for classical computers. As such, employing post-quantum cryptography for authenticating each stage of the bootloader may consume significantly more memory, while injecting more delay when initiating execution of the operating system due to the time required to authenticate each signature for each stage of the bootloader that is protected using post-quantum cryptography.

SUMMARY

In general, various aspects of the techniques are directed to post-quantum cryptography for secure boot that may reduce the number of post-quantum cryptographic signatures required for securing the various bootloader stages (which may include boot drivers, startup files, software modules, etc.). Rather than employ post-quantum cryptographic signatures for each software module executed during the boot process, a computing device may use a single post-quantum cryptographic (PQC) signature for securing a list of classical cryptographic signatures (e.g., that conform to industry standards for classical computers), where each classical cryptographic signature may secure a different bootloader stage executed during the boot process. In this way, the relatively large size of the single post-quantum cryptographic signature (compared to classical cryptographic signatures) is amortized across all of the classical cryptographic signatures included in the list of classical cryptographic signatures.

The various aspects of the techniques may therefore improve operation of the computing device itself. For example, by amortizing the size of the post-cryptographic signature across all of the classical cryptographic signatures, the computing device may reduce storage space required to secure the bootloader from attacks by quantum computers relative to using a post-quantum cryptographic signatures for each bootloader stage. As cryptographic signatures are usually stored to secure memory (e.g., memory that is read-only, which is also referred to a read-only memory-ROM, and/or one-time programmable-OTP-memory), reducing the size of the ROM may also reduce monetary expenses associated with securing the computing device. Furthermore, authenticating post-cryptographic signatures may consume significantly more processor cycles compared to classical cryptographic signatures, and reducing the number of post-quantum cryptographic signatures used to secure bootloader stages may result in less processing cycles consumed, which may also improve power consumption along with other computing resources, such as memory bus bandwidth, etc.

In one example, various aspects of the techniques are directed to a method comprising: prior to executing a first bootloader stage of a sequence of one or more bootloader stages, obtaining, by a processor, a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages; applying a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, comparing a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, executing the first bootloader stage.

In another example, various aspects of the techniques are directed to a computing device comprising: a secure memory configured to store a post-quantum cryptographic reference signature; a storage device configured to store a sequence of one or more bootloader stages, a digitally signed list of classical cryptographic reference signatures, and a post-quantum cryptographic public key; and a processor configured to: prior to executing a first bootloader stage of the sequence of one or more bootloader stages, obtain the digitally signed list of classical cryptographic reference signatures, the post-quantum cryptographic reference signature, and the post-quantum cryptographic public key, each of the digitally signed list of classical cryptographic reference signatures corresponding to a different bootloader stage of the sequence of one or more bootloader stages; apply a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, compare a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, execute the first bootloader stage.

In another example, various aspects of the techniques are directed to a non-transitory computer-readable storage medium having instructions stored thereon that, when executed, cause one or more processors to: prior to executing a first bootloader stage of a sequence of one or more bootloader stages, obtain a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages; apply a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, compare a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, execute the first bootloader stage.

In another example, various aspects of the techniques are directed to a computer-program product having instructions stored thereon that, when executed, cause one or more processors to: prior to executing a first bootloader stage of a sequence of one or more bootloader stages, obtain a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages; apply a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, compare a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, execute the first bootloader stage.

In another example, various aspects of the techniques are directed to an apparatus comprising: prior to executing a first bootloader stage of a sequence of one or more bootloader stages, means for obtaining a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages; means for applying a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, means for comparing a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, means for executing the first bootloader stage.

The details of one or more examples are set forth in the accompanying drawings and the description below. Other features, objects, and advantages of the disclosure will be apparent from the description and drawings, and from the claims.

DETAILED DESCRIPTION

Figure 1:
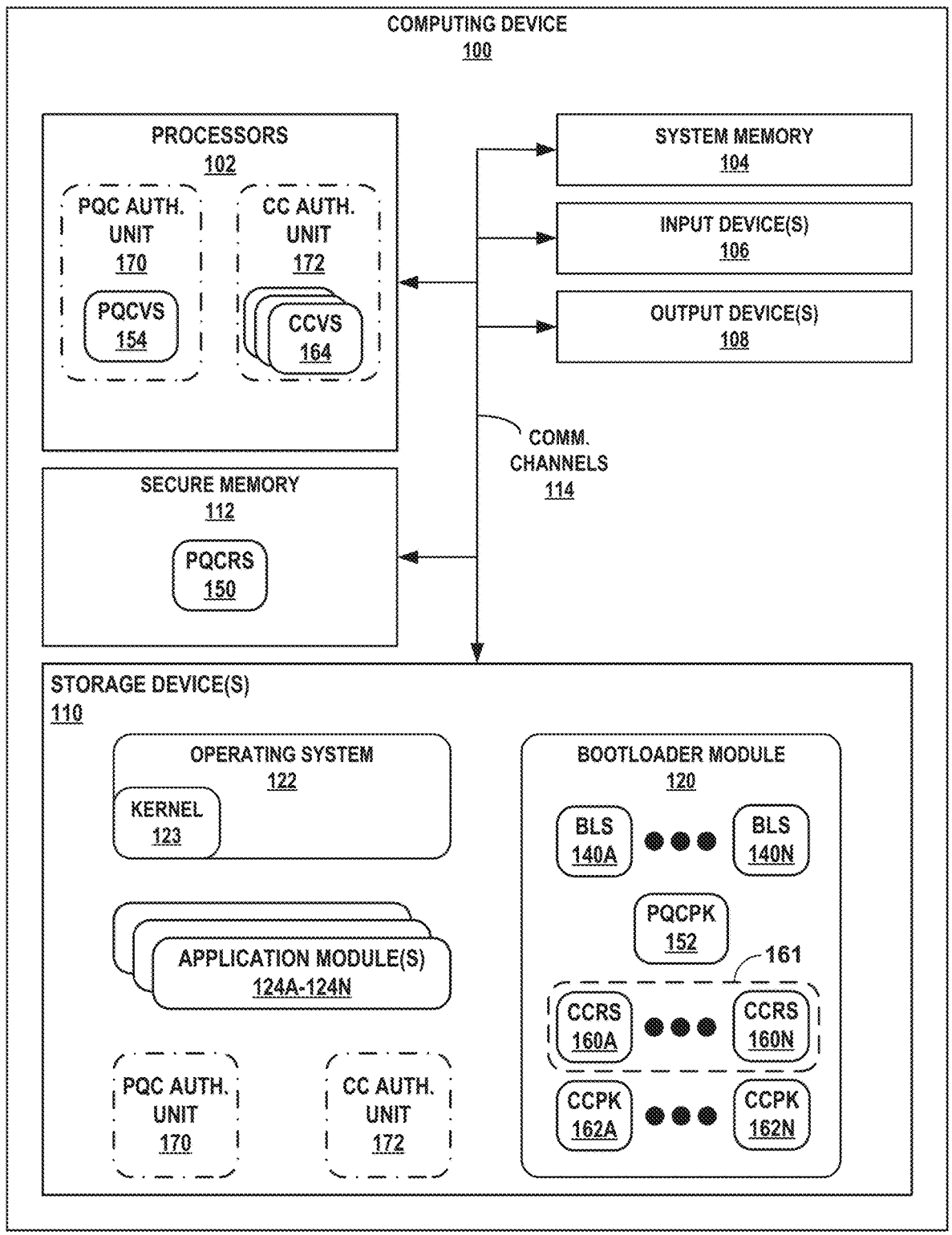
FIG. 1 is a block diagram illustrating an example computing device configured to implement secure boot using post-quantum cryptography in accordance with one or more aspects of the present disclosure.

FIG. 1 is a block diagram illustrating an example computing device configured to implement secure boot using post-quantum cryptography in accordance with one or more aspects of the present disclosure. In the example of FIG. 1, a computing device 100 is shown, where examples of computing device 100 may include, but are not limited to, portable or mobile devices such as mobile phones (including smartphones), wearable computers (which may include extended reality-XR-headsets, such as virtual reality-VR-headsets, augmented reality-AR-headsets, mixed reality-MR-headsets, etc., smartwatches, activity trackers, smart glasses, etc.), laptop computers, desktop computers, tablet computers, smart television platforms, gaming controllers, gaming systems, servers, mainframes, etc.

As shown in the example of FIG. 1, computing device 100 may include one or more processors 102, a system memory 104, input devices 106, and output devices 108, storage devices 110, and secure memory 112, which may each be connected to one or more of each other via one or more communication channels 114. In some examples, communication channels 114 may include a system bus, network connection, inter-process communication data structure, or any other channel for communicating data). In other words, each of components 102, 104, 106, 108, and 110 may be interconnected (physically, communicatively, and/or operatively) via communication channels 114 for inter-component communications. Other examples of a computing device 100, may include a subset of the components or may include additional components not shown in FIG. 1. In some examples, one or more processors 102, storage devices 110, communication channels 114, and other hardware components that may not be shown in FIG. 1 may be configured as an isolated system on a chip (SoC). That is, various components of the SoC may be physically separated from the other portions of computing device 100 for additional security.

One or more processors 102 may implement functionality and/or execute instructions associated with computing device 100. Examples of processors 102 include application processors, display controllers, auxiliary processors, one or more sensor hubs, and any other hardware configured to function as a processor, a processing unit, a processing device, and/or processing circuitry. Modules 120, 122, and 124 may be operable by processors 102 to perform various actions, operations, or functions of computing device 100. For example, processors 102 of computing device 100 may retrieve and execute instructions stored by storage devices 110 that cause processors 102 to perform the operations discussed herein with respect to modules 120, 122, and 124. The instructions, when executed by processors 102, may cause computing device 100 to store information within storage devices 110.

System memory 104 may be random access memory (RAM), dynamic RAM (DRAM), other forms of DRAM such as synchronous DRAM (SDRAM), double data rate SDRAM (e.g. DDR1 SDRAM, DDR2 SDRAM, etc.) and similar types of computer memory. System memory 104 may be implemented as one or more external memory modules connected as a bank of memory and accessible by processor 102 using a directly connected memory bus or accessible by other system components using communication channels 114. System memory 104 may be configured as single in-line memory modules (SIMM), dual in-line memory modules (DIMM), Rambus in-line memory modules (RIMM), or other interconnection configurations. Processor 102 may store information at system memory 104 for use in performing operations. For example, processor 102 may cause data to be moved from storage device 110 into system memory 104. In some examples, the information may be instructions that processor 102 may use to perform an operation. After performing an operation using the information retrieved from storage device 110 and stored at system memory 104, processor 102 may cause the data from system memory 104 to be written back to storage device 110. In some examples, processor 102 may perform subsequent operations using the information stored at system memory 104.

Computing device 100 may include input devices 106. In some examples, input devices 106 may include motion sensors, one or more location sensors (e.g., a global positioning system (GPS) sensor, an indoor positioning sensor, or the like), one or more light sensors, one or more temperature sensors, one or more pressure (or grip) sensors, one or more physical switches, one or more proximity sensors, and one or more bio-sensors that can measure properties of the skin/blood, such as oxygen saturation, pulse, alcohol, blood sugar, etc. The example of FIG. 1 shows input devices 106 as internal to computing device 100, but in other examples, input devices 106 may include components that are external to computing device 100. One example may be an external keyboard connected via wired or wireless connection. Other examples may include a touch sensitive screen that may be part of output devices 108.

One or more output devices 108 of computing device 100 may generate output. Examples of output are tactile, audio, and video output. Output devices 108 of computing device 100, in one example, includes a presence-sensitive display, sound card, video graphics adapter card, speaker, liquid crystal display (LCD), or any other type of device for generating output to a human or machine.

One or more storage devices 110 within computing device 100 may store information for processing during operation of computing device 100 (e.g., computing device 100 may store data accessed by modules 120, 122, and 124 during execution by processors 102 of computing device 100). In some examples, storage devices 110 is a temporary memory, meaning that a primary purpose of storage devices 110 is not long-term storage. Storage components 110 of computing device 100 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 110, in some examples, also include one or more computer-readable storage media. Storage devices 110 in some examples include one or more non-transitory computer-readable storage mediums. Storage devices 110 may be configured to store larger amounts of information than typically stored by volatile memory. Storage devices 110 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 110 may store program instructions and/or information (e.g., data) associated with modules 120, 122, and/or 124. Storage devices 110 may include a memory configured to store data or other information associated with modules 120, 122, and/or 124.

Secure memory 112, which although not shown in the example of FIG. 1, may be part of the same integrated circuit as processor 102, a memory component of a system on chip (SoC), and/or (as shown in the example of FIG. 1) a discrete component coupled to processor 102. Secure memory 112 may include one-time programmable (OTP) read-only memory (ROM). In such examples, the OTP ROM may include any combination of hardware fuses, hardware anti-fuses, or software fuses. A software fuse may be a dedicated memory area that, once programmed, cannot be reprogrammed without erasing a portion of memory. The software fuse may protect memory from tampering or unauthorized disclosure by forcing an erase of sensitive data if there is an unauthorized access attempt on the memory. The forced erase may disable the device or system, which may prevent damage or disclosure of confidential data. In some examples, a software fuse may also be referred to as a joint test action group (JTAG) fuse. Other examples of secure memory 112 include on-chip static random access memory (SRAM), erasable programmable read only memory (EPROM), electrically erasable PROM (EEPROM) and similar types of memory that may either be programmed in a secure environment using specific programming equipment (a "programmer") or while in operation. Secure memory 112 may be included within a dedicated hardware processor distinct from processors 102.

Bootloader module 120 may represent a dedicated set of modules that initialize and otherwise configure computing device 100 (during initial powering on, which is referred to as "booting" or "booting up") for execution of operating system 122 and/or other low-level software (e.g., firmware, middleware, additional bootloaders, etc.). Bootloader module 120 may initialize processors 102 and other hardware and mediate interaction between operating system 122 and the underlying hardware. Bootloader module 120 may load a kernel 123 of operating system 122, which effectively provides an extensible way by which to present an interface between operating system 122 and the underlying hardware of computing device 100.

Kernel 123 may operate in what is referred to as a kernel space, which is separate from an application space presented by operating system 122 for execution of apps 124. Kernel 123 may have more privileges when compared to the application space, and presents an interface to the application space by which to interact with the underlying hardware of computing device 100. Kernel 123 is therefore separate from apps 124 in terms of executing with increased privileges and interfacing directly with the underlying hardware of computing device 100, potentially on behalf of higher level aspects of operating system 122 and/or apps 124.

Apps 124 represent all the various individual applications and services executing at and accessible from computing device 100. A user of computing device 100 may interact with a graphical user interface associated with one or more apps 124 to cause computing device 100 to perform a function. Application modules may include, a word processing application, spreadsheet or calculator application, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 100.

As noted above, bootloader module 120 may execute during a boot phase in which computing device 100 is first powered on (from being powered off), and is granted almost unlimited access to computing device 100 (including possibly sensitive data or other private information stored to storage devices 110 as well operating system 122, application modules 124, etc.). As such, malicious users may attempt to manipulate bootloader module 120 to gain access and/or possibly control of computing device 100 for purposes of obtaining the sensitive data or other private information, compromise operating system 122 (e.g., to insert a backdoor to gain unrestricted access to various hardware and software components of computing device 100, and/or execute malware, adware, ransomware and/or other malicious software), etc.

In an effort to prevent malicious users from compromising bootloader module 120, computing device 100 may implement a secure boot process that includes various security measures when initiating execution of (or, in other words, "booting up") software, such as operating system 122. Computing device 100 may initiate execution of operating system 122 using bootloader module 120 that performs various security measures (e.g., cryptography) to ensure that modules of bootloader module 120 (which may be referred to as "bootloader stages" or "stages") have not been tampered with or otherwise edited. Computing device 100 may verify one or more signatures associated with each stage of bootloader module 120 to authenticate, prior to execution, each stage of bootloader module 120, halting execution of one or more stages that fail authentication to avoid allowing access by malicious or otherwise altered modules.

The signatures for each of the stages of bootloader module 120 may conform to various industry standards designed for so-called "classical computers," which may be susceptible to advances in computing technology. For example, computers are being developed that exploit quantum mechanical phenomena (and hence are referred to as "quantum computers"), which may allow quantum computers to perform some calculations exponentially faster than such classical computers. One such calculation that quantum computers perform much faster than classical computers is authentication of signatures that may allow maliciously modified modules to execute and thereby grant unrestricted access to the underlying computer hardware (e.g., including the memory, which may store confidential or personal information).

To overcome the potential risk of quantum computers breaking encryption performed according to industry standards designed for classical computers, new industry standards for encryption are being developed that address the processing efficiency of quantum computers (where such new industry standards define algorithms for so-called "post-quantum cryptography"). However, post-quantum cryptography (PQC) may involve significantly larger signatures that consume significantly more amounts of memory and require significantly more processing resources (e.g., processing cycles, memory bus bandwidth, etc.) and associated power to authenticate compared to existing industry standards that define cryptography for classical computers. As such, employing post-quantum cryptography for authenticating each bootloader stage may consume significantly more memory (compared to classical cryptography), while injecting more delay when initiating execution of bootloader module 120 due to the time required to authenticate each signature for each stage that is protected using post-quantum cryptography.

In other words, PQC algorithms, such as SPHINCS+, have various costs that may make such PQC algorithms difficult to deploy versus classical cryptographic algorithms. As an example, the SPHINCS+ algorithms may employ public keys that are small in size (e.g., about 48 bytes—B—for 192-bit security) but signature sizes are relatively large (e.g., 35,664 bytes for 192-bit security). In a secure boot chain (which is another way to refer to the ordered execution of bootloader stages, where each stage is authenticated prior to execution of the next bootloader stage), several (e.g., 10 or more) bootloader stages may be required to fully boot a device, where each bootloader stages reside in a separate partition in storage devices 110.

Each bootloader stage may be relatively small (e.g., 8 kilobytes-KBs), and each bootloader stage may be signed separately in a standard verified boot (which is another way to refer to "secure boot") flow. Classical cryptographic algorithms may have small signatures (e.g., 96 bytes for ECDSA using the NIST P384 curve). As such, moving from classical cryptographic algorithms to PQC algorithms may result in 10 bootloaders on the own respective partition with 96 B classical cryptographic signatures having 35,664 B PQC signatures. The overall cost of 960 B (for 10 bootloader stages each having 96 B classical cryptographic signatures) may therefore increase to 356,640 B PQC signatures, which, in this example, is an expansion of 371 times.

In accordance with techniques of this disclosure, computing device 100 may implement PQC for secure boot that may reduce the number of PQC signatures required for securing various bootloader stages (which may include boot drivers, startup files, software modules, etc.). As shown in the example of FIG. 1, bootloader module 120 includes bootloader stages (BLS) 140A-140N ("BLS 140"), which represent a sequentially ordered series of bootloader stages that bootloader module 120 loads one after another to initialize computing device 100 and load kernel 123 of operating system 122.

Rather than employ PQC signatures for each software module executed during the boot process (which is another way to refer to BLS 140), computing device 100 may use a single PQC reference signature 150 ("PQCRS 150") for securing a data structure 161 representative of classical cryptographic reference signatures (CCRS) 160A-160N (e.g., that conform to industry standards for classical computers), where each CCRS 160A-160N ("CCRS 160") may secure a different BLS 140 executed during the boot process. In this way, the relatively large size of the single PQCRS 150 (compared to classical cryptographic signatures) is amortized across all of the CCRS 160 included in the data structure 161. Below this data structure 161 is assumed to be a list (e.g., a linked list data structure), but may include any form of data structure including a tree data structure, a table data structure, a graph data structure, or any other type of data structure capable of storing CCRS 160.

As further shown in the example of FIG. 1, secure memory 112 may store single PQCRS 150 in order to limit manipulation of PQCRS 150 as secure memory 112 is read only, and may in various examples, represent OTP memory that is possibly tamper proof. PQCRS 150 is the only reference signature (whether conforming to PQC or CC algorithms) that needs to be stored to secure memory 112 given that PQCRS 150 is used to secure the remaining CCRS 160 (not in terms of encryption, but in terms of validating the underlying data has not been altered). Bootloader module 120 may include a PQC public key (PQCPK) 152, which is used during PQC authentication to generate a PQC verification signature (PQCVS) 154 according to the PQC algorithm (e.g., SPHINCS+). Bootloader module 120 also includes CC public keys (CCPK) 162A-162N that correspond to respective CCRS 160.

Processors 102 may represent a system on a chip (as noted above) that includes dedicated hash logic circuitry. Such dedicated hash logic circuitry is represented as PQC authentication unit 170 ("PQC auth. unit 170") and CC authentication unit 172 ("CC auth. unit 172"). PQC authentication unit 170 and CC authentication unit 172 may be implemented as separate dedicated hash logic circuitry or may represent single dedicated hash logic circuitry that implements both PQC authentication and CC authentication. Regardless, processors 102 may utilize dedicated hardware acceleration to perform PQC and/or CC authentication. While described as utilizing dedicated hardware acceleration to perform PQC and/or CC authentication, processors 102 may also execute software to perform PQC and/or CC authentication, which is denoted by the dashed-dotted lines for both PQC authentication unit 170 and CC authentication unit 172 (and by virtue of showing PQC authentication unit 170 and CC authentication unit 172 as being potentially stored to storage device 110).

In operation, processors 102 may, prior to executing a first BLS (e.g., BLS 140A) of a sequence of BLS 140, obtain a digitally signed list 161 (which is another way of referring to data structure 161) of CCRS 160, PQCRS 150, and PQCPK 162. That is, processors 102 may be programmed, upon booting up, to initiate PQC authentication unit 170 to read PQCRS 150 from secure memory 112. PQCRS 150 may be configured to also read list 161 of CCRS 160 along with PQCPB 152. In some instances, processors 102 may execute bootloader module 120 (via accessing a statically defined location in storage devices 110) to initiate reading of list 161 of CCRS 160 and PQCPK 152. In any event, each of CCRS 160 in digitally signed list 161 may correspond to a different BLS 140 of the sequence of one or more BLS 140.

PQC authentication unit 170 may apply a post-quantum cryptographic algorithm (e.g., SPHINCS+) with respect to PQCPK 152 and digitally signed list 161 of CCRS 160 to obtain a PQC verification signature 154. At a high level, PQC authentication unit 170 may apply SPHINCS+ algorithm to perform a one-way hash using PQCPK 152 over list 161 of CCRS 160 to obtain PQC verification signature 154. More information involving SPHINCS+ can be found in a paper by Bernstein, D. J., et al. entitled "SPHINCS: practical stateless hash-based signatures," published Feb. 2, 2015 (with permanent document identifier: 5c2820cfddf4c259cc7ea1eda384c9f9). While described with respect to SPHINCS+ herein, any type of PQC algorithm may be used to secure list 161 of CCRS 160 so long as the PQC algorithm is resilient to quantum computing processing to obtain a private key used to generate PQCRS 150. Example alternative PQC algorithms include Lamport signature schemes, Merkle signature scheme algorithms, WOTS schemes or any other hash-based PQC algorithm.

The choice of algorithm should be suitable to various design/scaling considerations. For large scale deployment, a stateless hash-based PQC algorithms provides some benefits over stateful PQC algorithms given that stateless hash-based PQC algorithms (such as SPHINCS+) may remove the requirement for maintaining state that may lead to compromises at large scale when hundreds if not thousands or more PQCRS are generated for distribution to hundreds, thousands, or possibly hundreds of thousands or more computing devices 100. For smaller scale distributions of PQCRS, a stateful PQC algorithm may be employed. However, SPHINCS+ and other stateless hash-based PQC algorithms may be selected for both small and large scale distribution of PQCRS.

In any event, PQC authentication unit 170 may compare PQCVS 154 to PQCRS 150 in order to authenticate list 161 of CCRS 160 as valid (meaning, not altered or otherwise tampered with). Responsive to PQCVS 154 matching PQCRS 150, processor 102 may initialize CC authentication unit 172, which may obtain first BLS 140A, CCRS 160A (corresponding to BLS 140A), and CCPK 162A (corresponding to CCRS 160A). Again, processors 102 may execute bootloader module 120, which may facilitate reading BLS 140A, CCRS 160A, and CCPK 162A.

CC authentication unit 172 may implement a CC algorithm, such as a secure hash algorithm (SHA). There are various different versions of SHA, which refers to a family of cryptographic hash functions published by the National Institute of Standards and Technology (NIST) as a United States Federal Information Processing Standard (FIPS). One version of SHA referred to as SHA-2 defines a family of two similar hash functions, with different block sizes, known as SHA-256 and SHA-512, which differ in word sizes (e.g., SHA-256 uses 32-bit words where SHA-512 uses 64-bit words). In this example, CC authentication unit 172 is assumed to implement the SHA-512 hash function, but CC authentication unit 172 may implement any available SHA hash function or other industry standard CC hash functions.

CC authentication unit 172 may apply the SHA-512 hash function using CCPK 162A to BLS 140A to obtain CC verification signature (CCVS) 164A (where FIG. 1 shows a collection of CCVS 164 that is assumed to represent CCVS 164A-164N that correspond to respective CCRS 160A-160N). CC authentication unit 172 may compare CCVS 164A to CCRS 160A to authenticate BLS 140A as valid (meaning, not altered or otherwise tampered with). In this respect, CC authentication unit 172 may compare first CCRS 160A in digitally signed list 161 of CCRS 160 to a first CCVS 164A obtained based on first BLS 140A. Responsive to first CCVS 164A matching first CCRS 160A, CC authentication unit 172 may interface with processor 102 to cause processors 102 to execute first BLS 140A.

This same process of authenticating BLS 140 may continue after successful execution of first BLS 140A, where processor 102 may once again initialize CC authentication unit 172 to confirm the validity of a second BLS 140B in the sequence of BLS 140. For example, responsive to executing first BLS 140A, CC authentication unit 172 may compare a second CCRS 160B in digitally signed list 161 of CCRS 160 to a second CCVS 164B obtained (using CCPK 162B) based on second BLS 140B. Responsive to second CCVS 164B matching second CCRS 160B, CC authentication unit 172 may interface with processor 102 to cause processors 102 to execute second BLS 140B.

Assuming processors 102 successfully execute all of BLS 140, processors 102 may execute kernel 123 of operating system 122, which loads operating system 122 in order to present the above described application space in which one or more apps 124 may execute. However, if PQCRS 150 does not match PQCVS 154 or if any one of CCRS 160 does not match a respective one of CCVS 164, bootloader module 120 exits with an error indicating that either list 161 has been compromised (because PQCRS 150 does not match PQCVS 154) or that one of BLS 140 has been compromised (because one of CCRS 160 does not match a respective one of CCVS 164).

As such, various aspects of the techniques may improve operation of computing device 100 itself. For example, by amortizing the size of PQCRS 150 across all of CCRS 160, computing device 100 may reduce storage space required to secure bootloader module 120 from attacks by quantum computers relative to using post-quantum cryptographic signatures for each of BLS 140. That is, PQCRS 150 is at least an order of magnitude larger in a number of bytes compared to a number of bytes that specifies first CCRS 160A (as noted above), whereby keeping CCRS 160 and adding PQCRS 150 only increases storage space consumed by a small amount compared to replacing all of CCRS 160 with corresponding PQCRS. As cryptographic signatures are usually stored to secure memory 112 (e.g., memory that is read-only, which is also referred to a read-only memory-ROM, and/or one-time programmable-OTP-memory), reducing the size of the ROM may also reduce monetary expenses associated with securing the computing device. Furthermore, authenticating post-cryptographic signatures may consume significantly more processor cycles compared to classical cryptographic signatures, and reducing the number of post-quantum cryptographic signatures used to secure bootloader stages may result in less processing cycles consumed, which may also improve power consumption along with other computing resources, such as memory bus bandwidth, etc.

In other words, to reduce the cost of the PQC algorithms, another partition is created which contains list 161 of cryptographically strong hashes (e.g., SHA-256, SHA-384, SHA-512, etc.) which describe the contents of the, e.g., 10 partitions storing BLS 140 (returning to the example above). It should be understood that "cryptographically strong hashes" is another way to refer to digital signatures (e.g., CCRS 160). This list 161 is then signed with a PQC algorithm that has a large signature size (SPINCS+ SHA-256 at 35,664 bytes per signature) and size increase of PQC is amortized among the BLS 140 (e.g., the reduction in impact per BLS 140 is inversely proportional to the number of BLS 140). In the example above, the overhead is reduced from 371 times size increase to a 37.1 times size increase since there are assumed to be 10 BLS 140. Once list 161 of hashes 160 is verified upon boot, the 960 bytes of hashes (10 stages×48 bytes) is kept in memory to verify each BLS 140 matches its corresponding hash 160.

Figure 2:
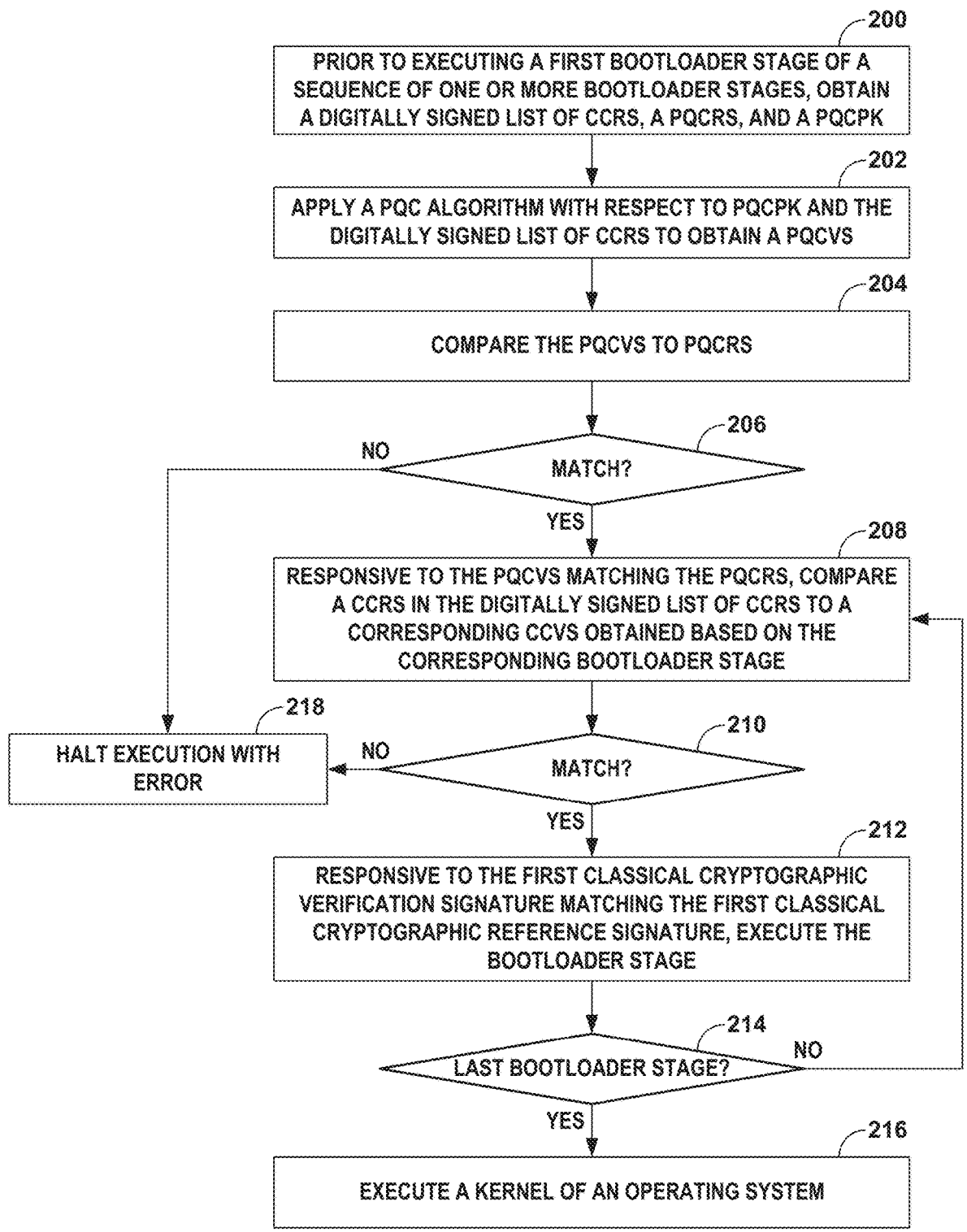
FIG. 2 is a flowchart illustrating example operation of the computing device shown in the example of FIG. 1 in performing secure boot using post-quantum cryptography in accordance with one or more aspects of the present disclosure.

FIG. 2 is a flowchart illustrating example operation of the computing device shown in the example of FIG. 1 in performing secure boot using post-quantum cryptography in accordance with one or more aspects of the present disclosure. As described above, processors 102 may, prior to executing a first BLS (e.g., BLS 140A) of a sequence of BLS 140, obtain, a digitally signed list 161 of CCRS 160, PQCRS 150, and PQCPK 162 (200). PQC authentication unit 170 of processors 102 may apply a post-quantum cryptographic algorithm (e.g., SPHINCS+) with respect to PQCPK 152 and digitally signed list 161 of CCRS 160 to obtain a PQC verification signature 154 (202).

PQC authentication unit 170 may compare PQCVS 154 to PQCRS 150 (204) in order to authenticate list 161 of CCRS 160 as valid (meaning, not altered or otherwise tampered with). Responsive to PQCVS 154 matching PQCRS 150 ("YES" 206), processor 102 may initialize CC authentication unit 172, which may obtain first BLS 140A, CCRS 160A (corresponding to BLS 140A), and CCPK 162A (corresponding to CCRS 160A). CC authentication unit 172 may apply the SHA-512 hash function using CCPK 162A to BLS 140A to obtain CC verification signature (CCVS) 164A. CC authentication unit 172 may compare CCVS 164A to CCRS 160A to authenticate BLS 140A as valid (meaning, not altered or otherwise tampered with). In this respect, CC authentication unit 172 may compare first CCRS 160A in digitally signed list 161 of CCRS 160 to a first CCVS 164A obtained based on first BLS 140A (208). Responsive to first CCVS 164A matching first CCRS 160A ("YES" 210), CC authentication unit 172 may interface with processor 102 to cause processors 102 to execute first BLS 140A (212).

This same process of authenticating BLS 140 may continue after successful execution of first BLS 140A, where processor 102 may once again initialize CC authentication unit 172 to confirm the validity of a second BLS 140B in the sequence of BLS 140 ("NO" 214). For example, responsive to executing first BLS 140A, CC authentication unit 172 may compare a second CCRS 160B in digitally signed list 161 of CCRS 160 to a second CCVS 164B obtained (using CCPK 162B) based on second BLS 140B (208). Responsive to second CCVS 164B matching second CCRS 160B ("YES" 210), CC authentication unit 172 may interface with processor 102 to cause processors 102 to execute second BLS 140B (212).

Assuming processors 102 successfully execute all of BLS 140 ("YES" 214), processors 102 may execute kernel 123 of operating system 122 (216), which loads operating system 122 in order to present the above described application space in which one or more apps 124 may execute. However, if PQCRS 150 does not match PQCVS 154 ("NO" 206) or if any one of CCRS 160 does not match a respective one of CCVS 164 ("NO" 210), bootloader module 120 halts execution (or, in other words, exits) with an error indicating that either list 161 has been compromised (because PQCRS 150 does not match PQCVS 154) or that one of BLS 140 has been compromised (because one of CCRS 160 does not match a respective one of CCVS 164) (218).

Various aspects of the techniques may enable various examples set forth below with respect to the following clauses.

Clause 1. A method comprising: prior to executing a first bootloader stage of a sequence of one or more bootloader stages, obtaining, by a processor, a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages; applying a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, comparing a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, executing the first bootloader stage.

Clause 2. The method of clause 1, further comprising: responsive to executing the first bootloader stage, comparing a second classical cryptographic reference signature in the digitally signed list of classical cryptographic signatures to a second classical cryptographic validation signature obtained based on a second bootloader stage of the sequence of one or more bootloader stages; and responsive to the second classical cryptographic validation signature matching the second classical cryptographic reference signature, executing the second bootloader stage.

Clause 3. The method of clause 1, wherein the post-quantum cryptographic algorithm is resilient to quantum computing processing to obtain a private key used to generate the post-quantum cryptographic reference signature.

Clause 4. The method of clause 1, wherein the post-quantum cryptographic algorithm comprises a stateless hash-based post-quantum cryptographic algorithm.

Clause 5. The method of clause 1, wherein obtaining the digitally signed list of classical cryptographic signatures, the post-quantum cryptographic reference signature, and the post-quantum cryptographic public key comprises retrieving, by the processor and from a one-time programmable memory, the post-quantum cryptographic reference signature.

Clause 6. The method of clause 1, wherein the first classical cryptographic verification signature is computed using a secure hash algorithm 2 hash function.

Clause 7. The method of clause 6, wherein the secure hash algorithm 2 hash function comprises a secure hash algorithm 512 (SHA-512) hash function.

Clause 8. The method of clause 1, wherein the post-quantum cryptographic reference signature is at least an order of magnitude larger in a number of bytes compared to a number of bytes that specifies the first classical cryptographic reference signature.

Clause 9. The method of clause 1, wherein the processor comprises a system on a chip that includes dedicated hash logic circuitry, and wherein applying the post-quantum cryptography algorithm comprises performing, by the dedicate hash logic circuitry, one or more hash functions with respect to the digitally signed list of classical cryptographic reference signatures to obtain the post-quantum cryptographic verification signature.

Clause 10. A computing device comprising: a secure memory configured to store a post-quantum cryptographic reference signature; a storage device configured to store a sequence of one or more bootloader stages, a digitally signed list of classical cryptographic reference signatures, and a post-quantum cryptographic public key; and a processor configured to: prior to executing a first bootloader stage of the sequence of one or more bootloader stages, obtain the digitally signed list of classical cryptographic reference signatures, the post-quantum cryptographic reference signature, and the post-quantum cryptographic public key, each of the digitally signed list of classical cryptographic reference signatures corresponding to a different bootloader stage of the sequence of one or more bootloader stages; apply a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, compare a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, execute the first bootloader stage.

Clause 11. The computing device of clause 10, wherein the one or more processors are further configured to: responsive to executing the first bootloader stage, compare a second classical cryptographic reference signature in the digitally signed list of classical cryptographic signatures to a second classical cryptographic validation signature obtained based on a second bootloader stage of the sequence of one or more bootloader stages; and responsive to the second classical cryptographic validation signature matching the second classical cryptographic reference signature, execute the second bootloader stage.

Clause 12. The computing device of clause 10, wherein the post-quantum cryptographic algorithm is resilient to quantum computing processing to obtain a private key used to generate the post-quantum cryptographic reference signature.

Clause 13. The computing device of clause 10, wherein the post-quantum cryptographic algorithm comprises a stateless hash-based post-quantum cryptographic algorithm.

Clause 14. The computing device of clause 10, wherein the processor is configured to, when configured to obtain the digitally signed list of classical cryptographic signatures, the post-quantum cryptographic reference signature, and the post-quantum cryptographic public key, comprises retrieve, from a one-time programmable memory, the post-quantum cryptographic reference signature.

Clause 15. The computing device of clause 10, wherein the first classical cryptographic verification signature is computed using a secure hash algorithm 2 hash function.

Clause 16. The computing device of clause 16, wherein the secure hash algorithm 2 hash function comprises a secure hash algorithm 512 (SHA-512) hash function.

Clause 17. The computing device of clause 10, wherein the post-quantum cryptographic reference signature is at least an order of magnitude larger in a number of bytes compared to a number of bytes that specifies the first classical cryptographic reference signature.

Clause 18. The computing device of clause 10, wherein the processor comprises a system on a chip that includes dedicated hash logic circuitry, and wherein the dedicated hash logic circuitry is configured to, when configured to apply the post-quantum cryptography algorithm, perform one or more hash functions with respect to the digitally signed list of classical cryptographic reference signatures to obtain the post-quantum cryptographic verification signature.

Clause 19. A non-transitory computer-readable storage medium having instructions stored thereon that, when executed, cause one or more processors to: prior to executing a first bootloader stage of a sequence of one or more bootloader stages, obtain a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages; apply a post-quantum cryptographic algorithm with respect to the post-quantum cryptographic public key and the digitally signed list of classical cryptographic reference signatures to obtain a post-quantum cryptographic verification signature; responsive to the post-quantum cryptographic verification signature matching the post-quantum cryptographic reference signature, compare a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, execute the first bootloader stage.

Clause 20. The non-transitory computer-readable storage medium of clause 20, wherein the post-quantum cryptographic algorithm is resilient to quantum computing processing to obtain a private key used to generate the post-quantum cryptographic reference signature.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method comprising:
prior to executing a first bootloader stage of a sequence of one or more bootloader stages, obtaining, by a processor, a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages;

applying a post-quantum cryptographic algorithm with respect to the post-quantum cryptographic public key and the digitally signed list of classical cryptographic reference signatures to obtain a post-quantum cryptographic verification signature;

responsive to the post-quantum cryptographic verification signature matching the post-quantum cryptographic reference signature, comparing a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, executing the first bootloader stage.

2. The method of claim 1, further comprising:

responsive to executing the first bootloader stage, comparing a second classical cryptographic reference signature in the digitally signed list of classical cryptographic signatures to a second classical cryptographic validation signature obtained based on a second bootloader stage of the sequence of one or more bootloader stages; and responsive to the second classical cryptographic validation signature matching the second classical cryptographic reference signature, executing the second bootloader stage.

3. The method of claim 1, wherein the post-quantum cryptographic algorithm is resilient to quantum computing processing to obtain a private key used to generate the post-quantum cryptographic reference signature.

4. The method of claim 1, wherein the post-quantum cryptographic algorithm comprises a stateless hash-based post-quantum cryptographic algorithm.

5. The method of claim 1, wherein obtaining the digitally signed list of classical cryptographic signatures, the post-quantum cryptographic reference signature, and the post-quantum cryptographic public key comprises retrieving, by the processor and from a one-time programmable memory, the post-quantum cryptographic reference signature.

6. The method of claim 1, wherein the first classical cryptographic verification signature is computed using a secure hash algorithm 2 hash function.

7. The method of claim 6, wherein the secure hash algorithm 2 hash function comprises a secure hash algorithm 512 (SHA-512) hash function.

8. The method of claim 1, wherein the post-quantum cryptographic reference signature is at least an order of magnitude larger in a number of bytes compared to a number of bytes that specifies the first classical cryptographic reference signature.

9. The method of claim 1,
wherein the processor comprises a system on a chip that includes dedicated hash logic circuitry, and
wherein applying the post-quantum cryptography algorithm comprises performing, by the dedicate hash logic circuitry, one or more hash functions with respect to the digitally signed list of classical cryptographic reference signatures to obtain the post-quantum cryptographic verification signature.

10. A computing device comprising:
a secure memory configured to store a post-quantum cryptographic reference signature;
a storage device configured to store a sequence of one or more bootloader stages, a digitally signed list of classical cryptographic reference signatures, and a post-quantum cryptographic public key; and a processor configured to:
prior to executing a first bootloader stage of the sequence of one or more bootloader stages, obtain the digitally signed list of classical cryptographic reference signatures, the post-quantum cryptographic reference signature, and the post-quantum cryptographic public key, each of the digitally signed list of classical cryptographic reference signatures corresponding to a different bootloader stage of the sequence of one or more bootloader stages;

apply a post-quantum cryptographic algorithm with respect to the post-quantum cryptographic public key and the digitally signed list of classical cryptographic reference signatures to obtain a post-quantum cryptographic verification signature;

responsive to the post-quantum cryptographic verification signature matching the post-quantum cryptographic reference signature, compare a first classical cryptographic reference signature in the digitally signed list of classical cryptographic reference signatures to a first classical cryptographic verification signature obtained based on the first bootloader stage; and responsive to the first classical cryptographic verification signature matching the first classical cryptographic reference signature, execute the first bootloader stage.

11. The computing device of claim 10, wherein the one or more processors are further configured to:

responsive to executing the first bootloader stage, compare a second classical cryptographic reference signature in the digitally signed list of classical cryptographic signatures to a second classical cryptographic validation signature obtained based on a second bootloader stage of the sequence of one or more bootloader stages; and responsive to the second classical cryptographic validation signature matching the second classical cryptographic reference signature, execute the second bootloader stage.

12. The computing device of claim 10, wherein the post-quantum cryptographic algorithm is resilient to quantum computing processing to obtain a private key used to generate the post-quantum cryptographic reference signature.

13. The computing device of claim 10, wherein the post-quantum cryptographic algorithm comprises a stateless hash-based post-quantum cryptographic algorithm.

14. The computing device of claim 10, wherein the processor is configured to, when configured to obtain the digitally signed list of classical cryptographic signatures, the post-quantum cryptographic reference signature, and the post-quantum cryptographic public key, comprises retrieve, from a one-time programmable memory, the post-quantum cryptographic reference signature.

15. The computing device of claim 10, wherein the first classical cryptographic verification signature is computed using a secure hash algorithm 2 hash function.

16. The computing device of claim 15, wherein the secure hash algorithm 2 hash function comprises a secure hash algorithm 512 (SHA-512) hash function.

17. The computing device of claim 10, wherein the post-quantum cryptographic reference signature is at least an order of magnitude larger in a number of bytes compared to a number of bytes that specifies the first classical cryptographic reference signature.

18. The computing device of claim 10,
wherein the processor comprises a system on a chip that includes dedicated hash logic circuitry, and
wherein the dedicated hash logic circuitry is configured to, when configured to apply the post-quantum cryptography algorithm, perform one or more hash functions with respect to the digitally signed list of classical cryptographic reference signatures to obtain the post-quantum cryptographic verification signature.

19. A non-transitory computer-readable storage medium having instructions stored thereon that, when executed, cause one or more processors to:
prior to executing a first bootloader stage of a sequence of one or more bootloader stages, obtain a digitally signed list of classical cryptographic reference signatures, a post-quantum cryptographic reference signature, and a post-quantum cryptographic public key, each of the digitally signed list of classical cryptographic reference signatures corresponding to a different bootloader stage of the sequence of one or more bootloader stages;
apply a post-quantum cryptographic algorithm with respect to the post-quantum cryptographic public key and the digitally signed list of classical cryptographic reference signatures to obtain a post-quantum cryptographic verification signature;
responsive to the post-quantum cryptographic verification signature matching the post-quantum cryptographic reference signature, compare a first classical cryptographic reference signature in the digitally signed list of classical cryptographic reference signatures to a first classical cryptographic verification signature obtained based on the first bootloader stage; and
responsive to the first classical cryptographic verification signature matching the first classical cryptographic reference signature, execute the first bootloader stage.

20. The non-transitory computer-readable storage medium of claim 19, wherein the post-quantum cryptographic algorithm is resilient to quantum computing processing to obtain a private key used to generate the post-quantum cryptographic reference signature.

\* \* \* \* \*